United States Patent [19]

Huppmann

[11] Patent Number: 5,725,964
[45] Date of Patent: Mar. 10, 1998

[54] FUEL CELL SYSTEM WITH REFORMING DEVICE

[75] Inventor: Gerhard Huppmann, Staatsangehörigkeit, Germany

[73] Assignee: MTU Motoren-und Turbinen-Union Friedrichshafen GmbH, Germany

[21] Appl. No.: 548,462

[22] Filed: Oct. 26, 1995

[30] Foreign Application Priority Data

Oct. 28, 1994 [DE] Germany ............... 44 38 555.2

[51] Int. Cl.⁶ .................... H01M 8/06; H01M 8/24
[52] U.S. Cl. .................... 429/20; 429/26; 429/34
[58] Field of Search ............... 429/17, 19, 20, 429/26, 34

[56] References Cited

U.S. PATENT DOCUMENTS

| | | | |
|---|---|---|---|
| 4,943,493 | 7/1990 | Vartanian | 429/17 |
| 5,047,299 | 9/1991 | Shockling | 429/20 |
| 5,100,743 | 3/1992 | Narita et al. | 429/19 |
| 5,212,022 | 5/1993 | Takahashi et al. | 429/19 |
| 5,302,470 | 4/1994 | Okada et al. | 429/17 |
| 5,366,819 | 11/1994 | Hartvigsen et al. | 429/17 |
| 5,426,002 | 6/1995 | Matsumura et al. | 429/20 |
| 5,527,631 | 6/1996 | Singh et al. | 429/20 |

FOREIGN PATENT DOCUMENTS

| | | |
|---|---|---|
| 0 205 146 | 12/1986 | European Pat. Off. . |
| 0 230 036 | 7/1987 | European Pat. Off. . |
| 0 456 848 | 11/1991 | European Pat. Off. . |
| 0 468 698 | 1/1992 | European Pat. Off. . |
| 0 468 700 | 1/1992 | European Pat. Off. . |
| 0 575 883 | 12/1993 | European Pat. Off. . |
| 0 598 530 | 5/1994 | European Pat. Off. . |
| 1 671 685 | 10/1971 | Germany . |
| 33 45 968 | 6/1984 | Germany . |
| 40 32 652 | 4/1992 | Germany . |
| 2 268 322 | 1/1994 | United Kingdom . |

*Primary Examiner*—Kathryn L. Gorgos
*Assistant Examiner*—William T. Leader
*Attorney, Agent, or Firm*—Evenson, McKeown, Edwards & Lenahan, P.L.L.C.

[57] ABSTRACT

The invention provides a fuel cell system with stacked fuel cells arranged in a fuel cell block, with an inlet for fresh combustion gas at the anodes on one side of fuel cell block and an outlet for the used combustion gas on the opposite side, as well as inlet for fresh cathode gas at the cathodes on another side of fuel cell block and an outlet for used cathode gas on the opposite side. A reforming device, which utilizes heat given off in the fuel cell reaction to reform the fresh combustion gas fed to the anode inlet of fuel cells, has an area provided with a catalyst. An inlet to the catalyst area receives fresh combustion gas to be reformed, which passes through the area containing the catalyst, in which the reforming process takes place, and exits through an outlet. The reforming device is designed as a heat exchanger located in the exhaust gas stream directly behind the fuel cell block. Exhaust gas from the fuel cells is guided through the heat exchanger as a heating gas for heating the reforming device.

12 Claims, 5 Drawing Sheets

FUEL CELL SYSTEM WITH REFORMING DEVICE

BACKGROUND AND SUMMARY OF THE INVENTION

The invention relates to a fuel cell system in which fuel cells are arranged in a fuel cell block in the form of a stack.

Fuel cell systems of this type generally have an inlet for the fresh combustion gas at the anodes on one side of the fuel cell block and an outlet for the burnt combustion gas on the opposite side, as well as an inlet for the fresh cathode gas at the cathodes on another side of the fuel cell block, and an outlet for the used cathode gas on the opposite side. Such systems also have a reforming device heated by the heat generated in the fuel cell reaction, for reforming the fresh combustion gas to be supplied to the anode input of the fuel cells. For this purpose, a catalyst is arranged in a space that has an inlet for receiving the fresh combustion gas to be reformed and an outlet connected with the anode inlet for the reformed fresh combustion gas, wherein the reforming process takes place.

The operation of fuel cells usually requires advance reforming of combustion gases containing hydrocarbons, in order to provide a combustion gas with a composition that is accessible to the fuel cell reaction. Such reforming is especially necessary for the preparation of combustion gas for high-temperature fuel cells that use alkaline molten carbonate electrodes (MCFC-molten carbonate fuel cell). The hydrocarbon components of the combustion gas are converted into CO, $CO_2$, and $H_2$ by adding the stoichiometrically necessary quantity of steam to a catalyst at high temperature. In the case of methane (natural gas), for example, the corresponding reaction proceeds endothermally under the following equilibrium:

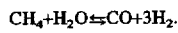

$$CH_4 + H_2O \rightleftarrows CO + 3H_2.$$

The reaction enthalpy required for a process leading to hydrogen formation is supplied by the exothermal reactions of the fuel cell. As a result, with opposite effect, both of the reaction equilibria taking place in the fuel cell (i.e., the reforming reaction and the fuel cell reaction), are displaced in the desired direction. That is, the cell is at once cooled by consumption of heat absorbed during the endothermal reforming process, while the consumption of the resultant hydrogen by the fuel cell reaction prevents the formation of a hydrogen concentration that would interfere with the reforming process.

According to the known prior art, in fuel cells with alkaline molten carbonate electrodes (MCFC) as well as other types of fuel cells, the combustion gas is reformed in three different ways:

In external reforming by a separately heated reforming device, the above listed advantages of mutually favorable influence of the thermodynamic and chemical parameters are not utilized, and hence there is a pronounced negative influence on the efficiency of the system.

In direct internal reforming, the catalyst material that triggers the reforming reaction is added directly into each individual fuel cell, wherein reforming takes place. On the one hand, this is the best possible type of reforming from a thermodynamic standpoint, because in this case both reactions, i.e., the fuel cell reaction and the reforming process, are in direct physical and thermal contact, thus optimizing their mutual influence. On the other hand, however, this technique encounters problems with the catalyst material, since the latter is readily contaminated by electrolytes from the fuel cell, and thus loses its efficiency. No solution to this problem has yet been found.

Finally, with indirect internal reforming in the fuel cell block, the catalyst is contained in separate reforming cells which are added at regular intervals (for example, after every fifth fuel cell). The reforming process then takes place in the reforming cells, which are in thermal contact with the adjacent cells. This type of reforming, which provides the best protection for the catalyst, ensuring a long lifetime with good performance, is currently rated the best. However, construction of such a fuel cell system is expensive, and the process of guiding the feeds through the inlets of the reforming cells, and between the outlets of the reforming cells and the inlets at the anodes of the fuel cells, is complicated and hence uneconomical.

A prior art fuel cell system of the latter type, with reforming cells 7' for indirect internal reforming is shown in FIG. 6. Fuel cell block 1' consists of a plurality of fuel cells 2 located between two compression plates 12 with interposition of end plates 13 to form a stack. At regular intervals (namely after every five fuel cells), a reforming cell 7' is provided that is in thermal contact with the adjacent fuel cells 2. The fresh combustion gas to be reformed is supplied to reforming cells 7' through a gas distributor 14 from which feeds with dielectric interruptions 15 run to the inlets of reforming cells 7'. The outlets of reforming cells 7' are located at the diagonally opposite corners of fuel cell block 1' (not shown in FIG. 6), and connected in appropriate fashion by lines to gas distributors.

The goal of the present invention is to provide a fuel cell system of the type described above, in which reforming can be performed with a high degree of efficiency and a less complicated system design.

The fuel cell system according to the invention has the important advantage that the catalyst material of the reforming device is protected against contamination by the electrolytes of the fuel cells.

Another important advantage of the invention is the simplicity of the gas guidance arrangement, in which only two gas channels are required to supply the fresh combustion gas to be reformed and to supply the reformed fresh combustion gas to the anode inlets of the fuel cells.

Another important advantage of the system according to the invention is that when the catalyst material is exhausted in the reforming device (or in the event of other defects that relate to the reforming device), it is possible to replace the reforming device without destroying the fuel cell block.

In a preferred embodiment of the invention, the reforming device is located in the exhaust gas stream at the cathode outlet, which results in maximum utilization of the heat released during the fuel cell reaction.

In another preferred embodiment, the reforming device is mounted inside an outlet scoop provided at the corresponding outlet of the fuel cell block. This results in maximum compactness.

In still another especially advantageous embodiment, the fuel cell block and the reforming device are located inside a common protective housing, with the areas at the inlets and outlets of the anodes and cathodes being separated from one another by separating elements extending between the fuel cell block and the interior of the protective housing, while the reforming device itself is located in the area thus formed at the cathode outlet or anode outlet. As a result, the entire fuel cell system can be manufactured at low cost, and a high degree of efficiency for the entire fuel cell system can be achieved.

Other objects, advantages and novel features of the present invention will become apparent from the following

DETAILED DESCRIPTION OF THE DRAWINGS

Figure 2:
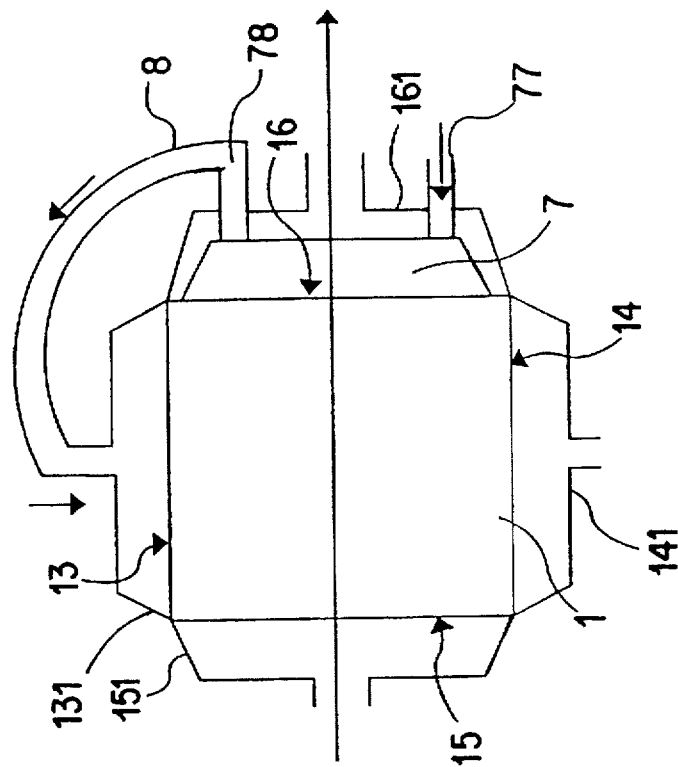
FIG. 2 is a conceptual schematic top view of the first embodiment shown in FIG. 1.
Figure 1:
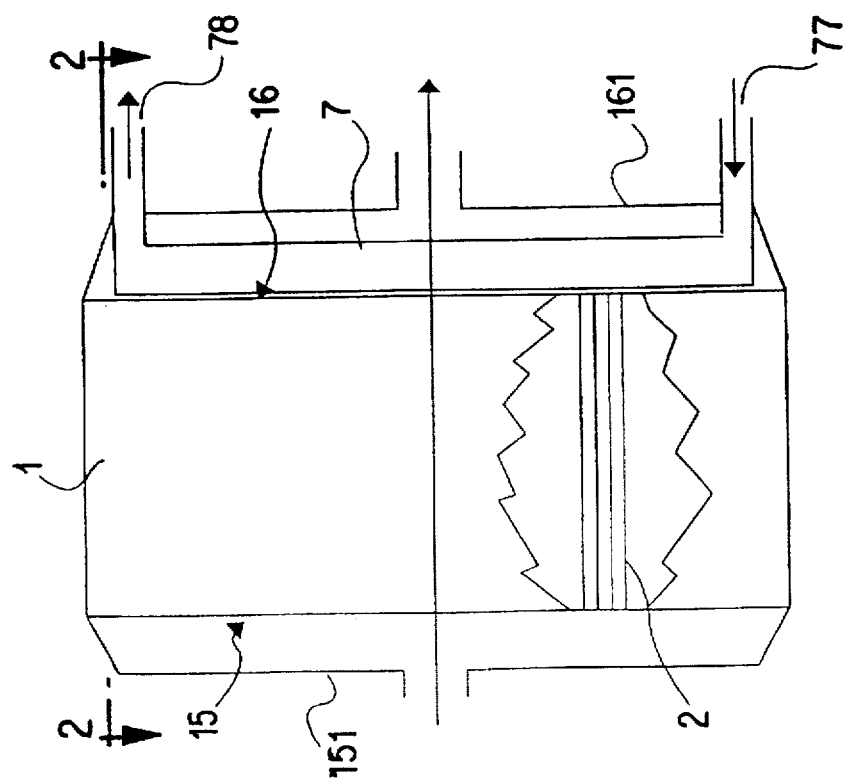
FIG. 1 is a partially broken away conceptual schematic side view of a first embodiment of the fuel cell system according to the invention.

FIGS. 1 and 2 (which are shown on different scales) show a side view and a cross-sectional top view respectively, of a fuel cell system according to the invention. As best seen in FIG. 1, a fuel cell block 1 is formed by a plurality of fuel cells 2 arranged in a stack (of which only a few are shown). Fuel cells 2 each have an inlet 13 for fresh combustion gas at the anodes on one side of fuel cell block 1 (at the top in FIG. 2), and an outlet 14 for used combustion gas on the opposite side (at the bottom in FIG. 2). An inlet 15 is provided for fresh cathode gas at the cathodes of the fuel cells (at the left in FIG. 2), and an outlet 16 receives used cathode gas on the opposite side (on the right in FIG. 2). At inlets 13 and 15 and outlets 14 and 16 of fuel cells 2, inlet and outlet scoops 131, 141, 151, and 161 are provided, through which the respective gas streams can be distributed or collected at the respective sides of fuel cell block 1.

Figure 3:
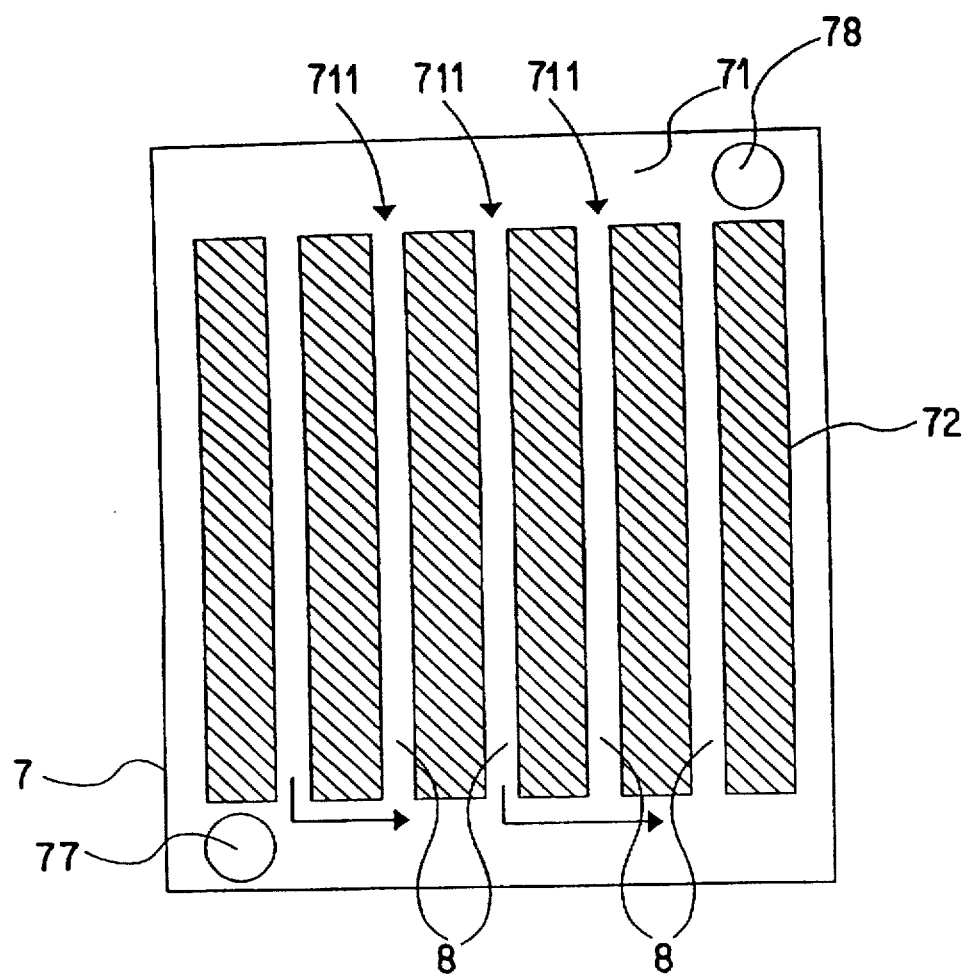
FIG. 3 is a conceptual schematic view of the reforming device according to the present invention.

Reforming device 7, in the form of a heat exchanger is shown in FIG. 3. It is located directly in the exhaust gas stream at the cathode outlet 16 of fuel cell stack 1 in the embodiment shown in FIGS. 1 and 2, and has a cross-sectional area which essentially matches that of the respective side of fuel cell stack 1, as shown in FIGS. 1 and 2.

As shown in FIG. 3, reforming device 7 contains a first area 71 with an inlet 77 to receive the fresh combustion gas to be reformed, and an outlet 78 to exhaust the reformed fresh combustion gas. This area 71 contains a plurality of vertical channels 711 which contain the catalyst used in the reforming process, in the form of a filling composed of parts coated with catalyst material, or of catalyst pellets. The catalyst material (not shown specifically in FIG. 3) is indicated by reference number 8.

Reforming device 7 also contains a second area 72 thermally coupled with first area 71, through which the exhaust gas stream from cathode outlet 16 of fuel cell block 2 is guided as a heating gas to heat the reforming device 7. Thus, heat drawn from the exhaust gas stream of cathode outlet 16 of fuel cell block 1 in second area 72 of reforming device 7 is transmitted to catalyst material 8 in first area 71 of the regeneration device, and is used there for the endothermal reforming process.

The fresh combustion gas to be reformed is fed to inlet 77 of reforming device 7 and passes through channels 711 filled with catalyst material 8 to the outlet 78, which is connected by a line 8 with scoop 131 at anode inlet 13 of fuel cell block 1.

The flow pattern in the fuel cell system is therefore as follows:

The fresh cathode gas enters fuel cell stack 1 through scoop 151 on the cathode inlet side 15. The cathode gas heated in the fuel cell reaction in fuel cell block 1 exits the fuel cell stack 1 at cathode outlet 16 and enters reforming device 7, passing through second area 72, where it transfers a portion of its heat to the fresh combustion gas flowing through channels 711 of first area 71 of reforming device 7. In this manner the fresh combustion gas receives the heat necessary for the reforming process. The cathode gas escaping from reforming device 7 leaves the fuel cell system through scoop 161.

The combustion gas that has entered reforming device 7 at inlet 77 leaves this device at outlet 78 after the reforming process, and is guided through line 8 to scoop 131 at anode inlet 13 of the fuel cell block. Thereafter, it passes the anodes of the fuel cells, and leaves fuel cell block 1 at its anode outlet side 14 through scoop 141.

Figure 4:
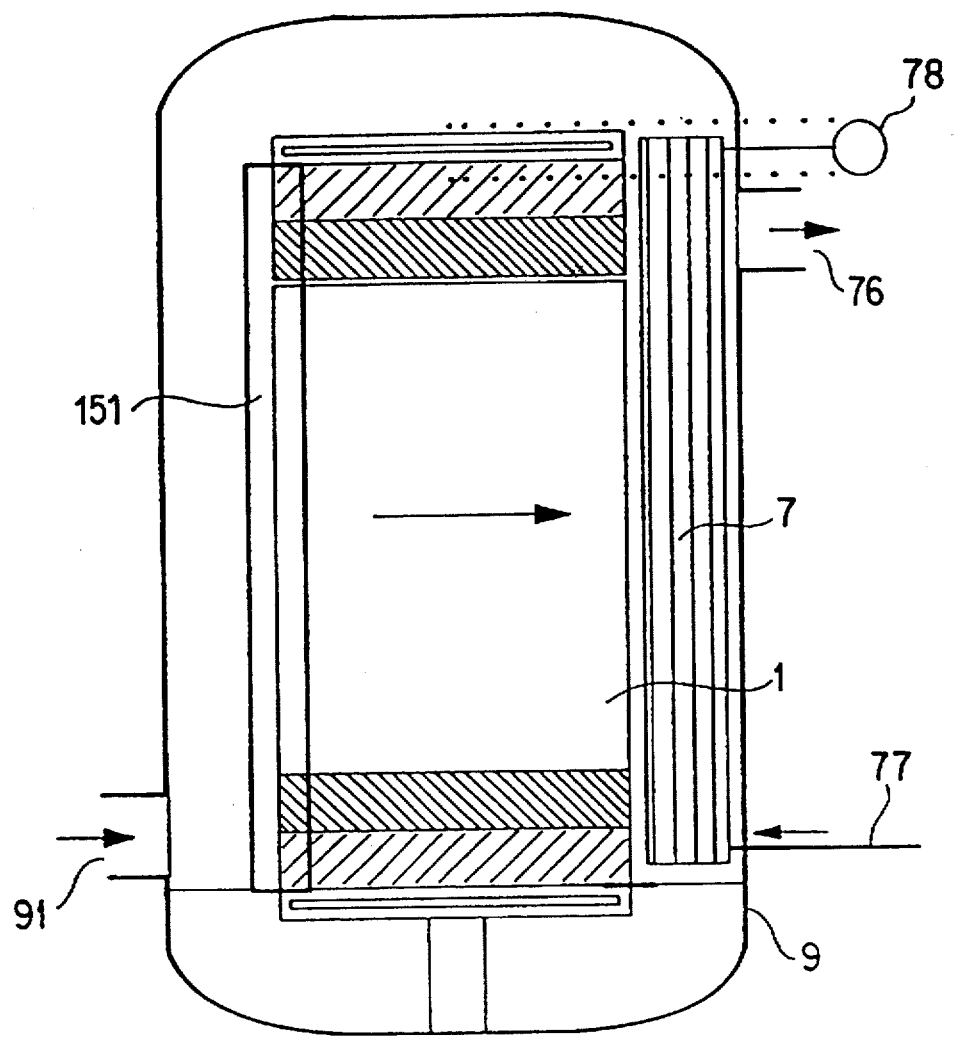
FIG. 4 is a schematic cross-sectional side view of a second embodiment of the fuel cell system according to the invention.
Figure 5:
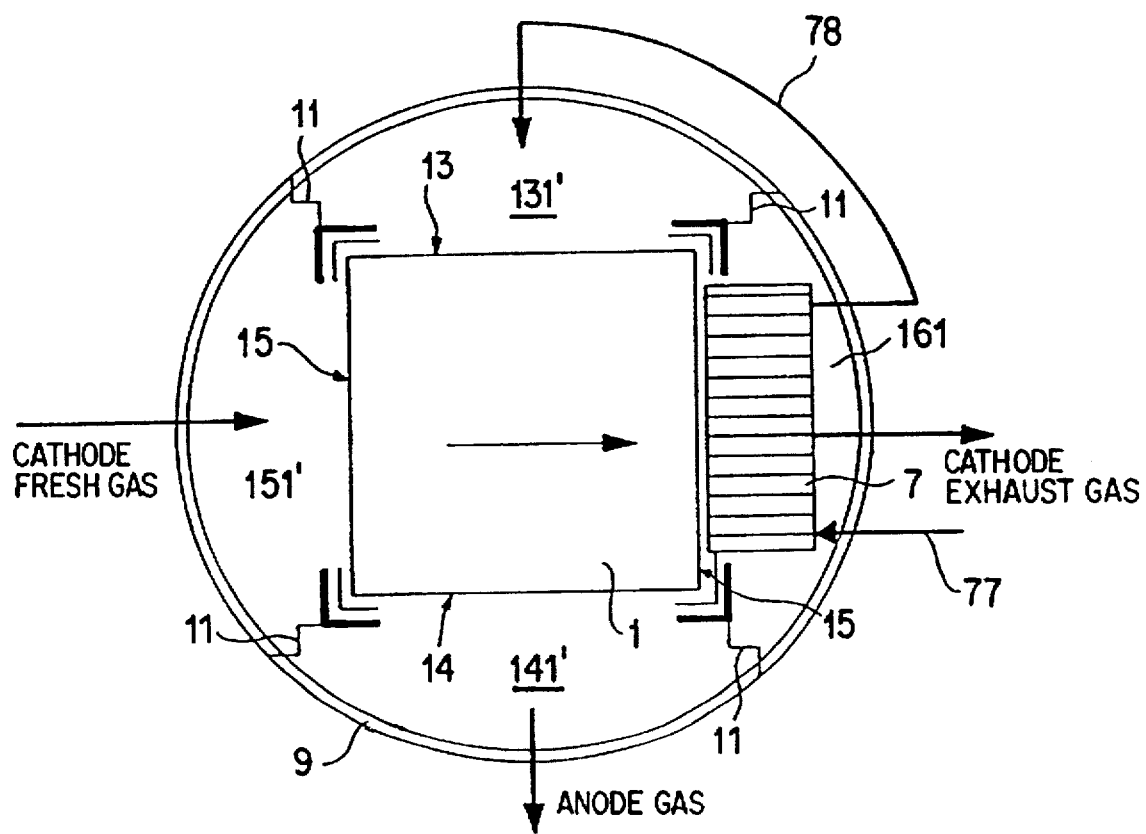
FIG. 5 is a schematic cross-sectional top view of the second embodiment shown in FIG. 4.
Figure 6:
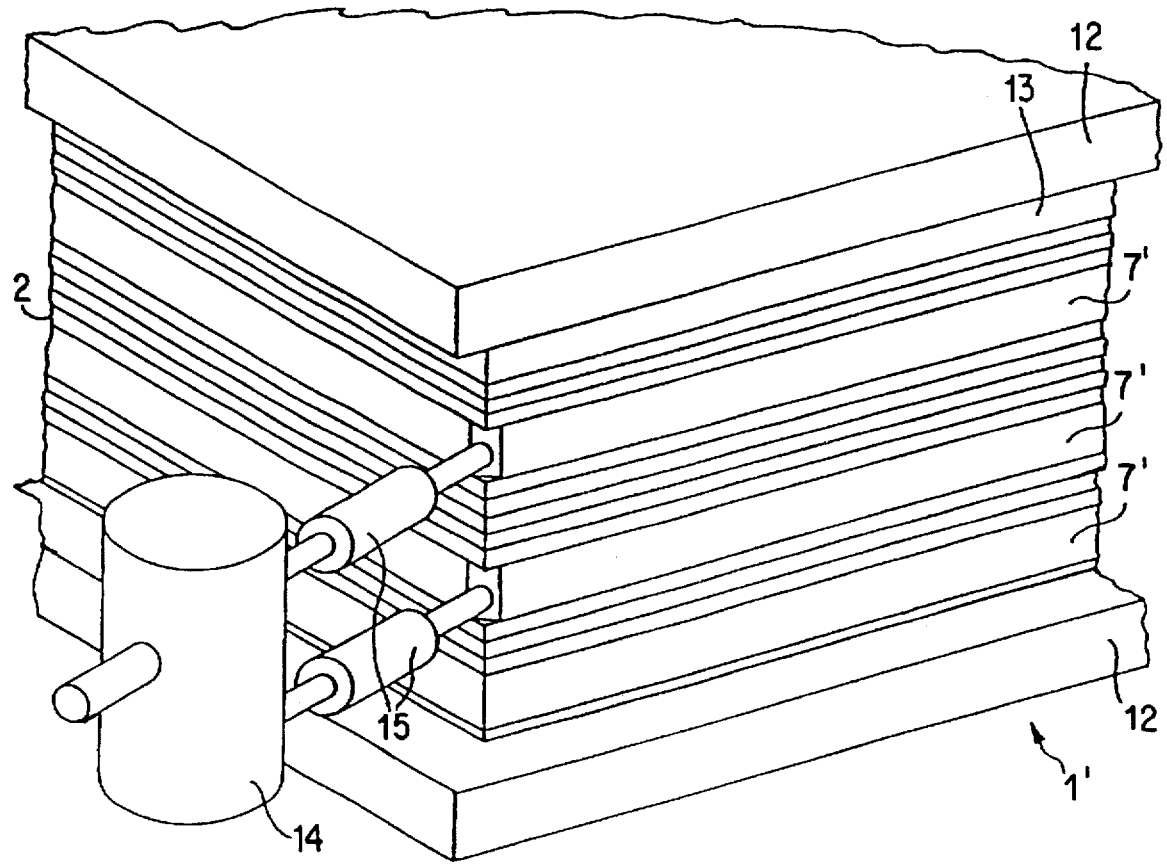
FIG. 6 is a perspective partial view of a fuel cell system with a reforming device according to the prior art.

FIGS. 4 and 5 show another embodiment of the fuel cell system with a reforming device according to the invention. Fuel cell block 1 is located together with reforming device 7, inside a protective housing 9. In front of inlet and outlet sides 13, 14, 15, and 16 of the anodes and cathodes, areas 131', 141', 151', and 161' are formed by separating elements 11 that extend between fuel cell block 1 and the interior of protective housing 9. The areas 131', 141', 151' and 161' thus correspond to the areas that are formed under scoops 131, 141, 151, and 161. The separating elements can consist, for example, of flexible metal ribs. Reforming device 7 is located in area 161' at cathode outlet 16.

The fresh cathode gas that enters area 151' through cathode inlet 91 (FIG. 4) flows from cathode inlet 15 through fuel cell block 1, and leaves the latter at the cathode outlet side 16. After passing through reforming device 7 located directly behind cathode outlet 16, the used cathode gas (which has given up a portion of its heat to the fresh combustion gas flowing through reforming unit 7) enters area 161' and leaves protective housing 9 through an outlet 76 (FIG. 4) for the cathode outlet gas. Fresh combustion gas is supplied through a line 77 to the inlet of reforming device 7 and after passing through the latter, exits via a line 78, through which it is conducted into area 131' at the anode inlet side 13 of fuel cell block 1.

In addition to the embodiments described, numerous variations are possible. Thus, reforming device 7 can also be mounted in the exhaust gas stream at anode outlet While in the embodiments described, the cross sectional area of reforming device 7 essentially matches that of the corresponding outlet side 16 of fuel cell block 1, with reforming device 7 mounted against fuel cell block 1, the cross-sectional area of reforming device 7 can also be smaller than that of the outlet side 16 or 14 of the fuel cell block. In the latter case, the reforming device 7 is then fitted against the fuel cell block with interposition of a scoop that matches the respective cross-sections. Furthermore, in contrast to the embodiments described, the catalyst material can also be provided by surface coating of channels 711 of reforming device 7, with the channels then being designed with a surface area that is as large as possible relative to their cross section.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A fuel cell system comprising:

a stack of fuel cells which form a fuel cell block, each of said fuel cells having a cathode and an anode;

said fuel cell block having on one side thereof a combustion gas inlet for receiving fresh combustion gas which flows to anodes in said fuel cell block, and a combustion gas outlet through which used combustion gas exits on a side of said fuel cell block opposite said combustion gas inlet;

said fuel cell block also having on another side thereof a cathode gas inlet for receiving fresh cathode gas which flows to cathodes in said fuel cell block, and a cathode gas outlet through which used cathode gas exits on a side of said fuel cell block opposite said cathode gas inlet;

a reforming device heated by heat released by a fuel cell reaction in said fuel cell block, for reforming fresh combustion gas to be supplied to the combustion gas inlet; and a catalyst arranged in a first area of said reforming device in which said reforming of said combustion gas takes place, said first area having an inlet for receiving fresh combustion gas to be reformed and an outlet connected to said combustion gas inlet of said fuel cell block, through which reformed combustion gas flows to said anodes in said fuel cell block;

wherein said reforming device comprises a heat exchanger located in a stream of exhaust gas exiting directly from said fuel cell block, said heat exchanger having a second area thermally coupled to said first area, through which said stream of exhaust gas is guided from the fuel cell block as a heating gas for heating said reforming device, and a cross-sectional area of the reforming device matches substantially a cross-sectional area of an outlet side of fuel cell block, and the reforming device abuts the fuel cell block.

2. Fuel cell system according to claim 1 wherein the reforming device is located in said stream of exhaust gas at said cathode gas outlet.

3. Fuel cell system according to claim 1 wherein the reforming device is mounted inside an outlet scoop provided at a corresponding outlet of the fuel cell block.

4. Fuel cell system according to claim 1 wherein the first area of the reforming device has a plurality of channels in which a catalyst is provided, and which are located in the second area.

5. Fuel cell system according to claim 4 wherein said channels run perpendicular to said stream of exhaust gas, and are filled with at least one of: particles coated with catalyst material and catalyst pellets.

6. Fuel cell system according to claim 5 wherein said channels are coated with catalyst material.

7. Fuel cell system according to claim 5 wherein the fuel cell block and reforming device are mounted inside a common protective housing, with areas of respective inlets and outlets at the anodes and cathodes being separated from one another by separating elements extending between said fuel cell block and the interior of the protective housing, and wherein the reforming device is provided in the area thus formed at the anode outlet.

8. Fuel cell system according to claim 7 wherein said separating elements are flexible ribs.

9. Fuel cell system according to claim 4 wherein said channels are coated with catalyst material.

10. Fuel cell system according to claim 1 wherein the fuel cell block and reforming device are mounted inside a common protective housing, with areas of respective inlets and outlets at the anodes and cathodes being separated from one another by separating elements extending between said fuel cell block and the interior of the protective housing, and wherein the reforming device is provided in the area thus formed at the cathode outlet.

11. A fuel cell system comprising:

a stack of fuel cells which form a fuel cell block, each of said fuel cells having a cathode and an anode;

said fuel cell block having on one side thereof a combustion gas inlet for receiving fresh combustion gas which flows to anodes in said fuel cell block, and a combustion gas outlet through which used combustion gas exits on a side of said fuel cell block opposite said combustion gas inlet;

said fuel cell block also having on another side thereof a cathode gas inlet for receiving fresh cathode gas which flows to cathodes in said fuel cell block, and a cathode gas outlet through which used cathode gas exits on a side of said fuel cell block opposite said cathode gas inlet;

a reforming device heated by heat released by a fuel cell reaction in said fuel cell block, for reforming fresh combustion gas to be supplied to the combustion gas inlet; and a catalyst arranged in a first area of said reforming device in which said reforming of said combustion gas takes place, said first area having an inlet for receiving fresh combustion gas to be reformed and an outlet connected to said combustion gas inlet of said fuel cell block, through which reformed combustion gas flows to said anodes in said fuel cell block;

wherein said reforming device comprises a heat exchanger located in a stream of exhaust gas exiting directly from said fuel cell block, said heat exchanger having a second area thermally coupled to said first area, through which said stream of exhaust gas is guided from the fuel cell block as a heating gas for heating said reforming device, and said reforming device has a cross-sectional area smaller than that of a corresponding outlet side of the fuel cell block, and the reforming device is mounted at the fuel cell block with a device configured to match respective cross-sections of the reforming device and the corresponding outlet side.

12. Fuel cell system according to claim 11 wherein the reforming device is mounted inside an outlet scoop provided at a corresponding outlet of the fuel cell block.

* * * * *